(12) United States Patent
Haecker et al.

(10) Patent No.: US 9,506,541 B2
(45) Date of Patent: Nov. 29, 2016

(54) ECCENTRIC BEARING

(75) Inventors: Juergen Haecker, Schwieberdingen (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 13/695,732

(22) PCT Filed: Mar. 10, 2011

(86) PCT No.: PCT/EP2011/053608
§ 371 (c)(1),
(2), (4) Date: Mar. 13, 2013

(87) PCT Pub. No.: WO2011/138078
PCT Pub. Date: Nov. 10, 2011

(65) Prior Publication Data
US 2013/0199320 A1 Aug. 8, 2013

(30) Foreign Application Priority Data
May 5, 2010 (DE) .................. 10 2010 028 584

(51) Int. Cl.
*F16H 25/14* (2006.01)
*F04B 9/04* (2006.01)
(Continued)

(52) U.S. Cl.
CPC ............... *F16H 25/14* (2013.01); *F04B 9/045* (2013.01); *F16C 19/50* (2013.01); *F16C 23/10* (2013.01); *F05B 2240/50* (2013.01); *Y10T 74/18296* (2015.01)

(58) Field of Classification Search
CPC .... F16C 19/50; F04C 29/0057; F04B 9/045; F16H 25/14
USPC ..................... 74/55; 384/565, 569
See application file for complete search history.

(56) References Cited

U.S. PATENT DOCUMENTS 2,244,197 A * 6/1941 Hessler ................ F16C 27/066
29/898.066
3,464,744 A * 9/1969 Fall ........................ A47B 88/10
384/19

(Continued)

FOREIGN PATENT DOCUMENTS

DE 10 2008 055 070 * 7/2010
FR 1156198 * 5/1958

(Continued)

OTHER PUBLICATIONS

Machine Translation of FR 1156198, Applicant: Indes, Published May 1958.*

(Continued)

*Primary Examiner* — William C Joyce
(74) *Attorney, Agent, or Firm* — Maginot, Moore & Beck LLP

(57) ABSTRACT

An eccentric bearing for an electrohydraulic piston-pump assembly of a vehicle brake system includes a shaft configured to be driven rotationally about its axis, a bearing ring eccentric relative to the shaft, and, in a gap between the bearing ring and shaft, rolling bodies with different diameters according to a differing width of the gap. When the shaft is rotationally driven, an eccentricity of the bearing ring circulates the shaft more slowly than the rotational speed of the shaft and drives a reciprocating movement of pump pistons which bear against the bearing ring. To ensure that the rolling bodies roll on and circulate the shaft, a radial elasticity loads the rolling bodies with prestress against the shaft and bearing ring. The prestress is caused by an undersize of the bearing ring or by an elastic ring on the shaft, on at least one rolling body or in the bearing ring.

11 Claims, 2 Drawing Sheets

(51) Int. Cl.
*F16C 19/50* (2006.01)
*F16C 23/10* (2006.01)

(56) References Cited

U.S. PATENT DOCUMENTS

| | | | | |
|---|---|---|---|---|
| 4,647,225 A | * | 3/1987 | Grass | F16C 13/006 384/10 |
| 5,111,712 A | * | 5/1992 | Kassouf et al. | 74/570.21 |
| 5,169,237 A | * | 12/1992 | Domenig | F16C 13/006 384/19 |

FOREIGN PATENT DOCUMENTS

| FR | 2 637 660 A1 | | 4/1990 |
|---|---|---|---|
| JP | 40-26401 Y1 | | 9/1965 |
| JP | 56-14623 A | | 2/1981 |
| JP | 56-147927 A | | 11/1981 |
| JP | 58-189815 U | | 12/1983 |
| JP | 61-215480 A | | 9/1986 |
| JP | 62-98025 | * | 5/1987 |
| JP | 2-168016 A | | 6/1990 |

OTHER PUBLICATIONS

International Search Report corresponding to PCT Application No. PCT/EP2011/053608, mailed Jun. 1, 2011 (German and English language document) (5 pages).

* cited by examiner

ECCENTRIC BEARING

This application is a 35 U.S.C. §371 National Stage Application of PCT/EP2011/053608, filed on Mar. 10, 2011, which claims the benefit of priority to Serial No. DE 10 2010 028 584.6, filed on May 5, 2010 in Germany, the disclosures of which are incorporated herein by reference in their entirety.

BACKGROUND

The disclosure relates to an eccentric bearing having the features described below. The eccentric bearing according to the disclosure is provided, in particular, for an electrohydraulic piston pump unit of a hydraulic brake system of a motor vehicle. Such pump units are used to generate a hydraulic brake pressure for brake actuation in slip-controlled and/or power brake systems.

Known eccentric bearings have an eccentric shaft which is mounted integrally, or rigidly in some other way, and eccentrically on a motor shaft of an electric motor or on an output shaft of a transmission that can be driven by the electric motor. Arranged on the eccentric shaft is a rolling contact bearing having a bearing ring concentrically surrounding the eccentric shaft and having rolling elements arranged around the shaft in a gap between the eccentric shaft and the bearing ring, generally but not necessarily at equal spacings. The rolling elements are usually rollers or needles although they can also be other rolling elements, e.g. balls. The bearing ring can be understood as an outer ring, and there can be an inner ring, said inner ring being press fitted onto the eccentric shaft for example. However, an inner ring is not necessary: the rolling elements can also roll directly on the eccentric shaft. One or more pump pistons of the pump piston unit rest by means of the ends thereof against the outside of the bearing ring. The pump pistons are pressed into contact with the bearing ring from the outside by springs, for example.

When driven in rotation, the eccentric shaft performs a movement on an orbital path owing to its eccentricity, rotating about itself in the process. Owing to the movement of the eccentric shaft on the orbital path, the bearing ring also moves on an orbital path or on the same orbital path and thereby drives the pump pistons resting externally against it to perform the desired reciprocating motion in order to deliver brake fluid or, more generally, fluid through alternate suction and displacement, as known from piston pumps. Owing to its rolling contact bearing arrangement, the bearing ring does not rotate with the eccentric shaft.

In electrohydraulic piston pump units for hydraulic brake systems of motor vehicles, the eccentric bearings convert a rotary motion of an electric motor or of an output shaft of a transmission into a reciprocating motion in order to drive the pump pistons.

SUMMARY

The eccentric bearing according to the disclosure having the features described below has a shaft, which can be driven rotationally, on which a rolling contact bearing having a bearing ring, which surrounds the shaft, and rolling elements, which are arranged around the shaft in a gap between the shaft and the bearing ring, wherein the rolling elements can be arranged at equal spacings, although they do not have to be. In contrast to known eccentric bearings, the shaft of the eccentric bearing according to the disclosure is provided concentrically with respect to the axis of rotation thereof, even if it is conceivable and not excluded by the disclosure that the shaft could be eccentric with respect to the axis of rotation thereof. Instead of or, if appropriate, in addition to an eccentricity of the shaft, the bearing ring is eccentric with respect to the shaft, and the rolling elements have different diameters according to a differing gap width between the shaft and the bearing ring owing to the eccentricity of the bearing ring with respect to the shaft. The rolling elements have diameters of the same size as the width of the gap between the bearing ring and the shaft at the circumferential location at which the respective rolling element is located.

When the shaft is driven in rotation, the rolling elements roll on the shaft and in the bearing ring and revolve around the shaft in the manner known from rolling contact bearings. During this process, the rolling elements of large diameter push the bearing ring away from the shaft, and the bearing ring approaches the shaft on the opposite side, where the rolling elements of small diameter are located. The changing gap width as it were revolves around the rotationally driven shaft together with the rolling elements, i.e. the widest, the narrowest and every other gap width revolve around the shaft with the rolling elements. The bearing ring moves on an orbital path around the shaft with an eccentricity with respect to the shaft. A rotary motion of the shaft is converted into a reciprocating motion of one or more pump pistons resting against the outside of the bearing ring. The rolling elements revolve around the shaft with a lower speed of revolution than would correspond to a speed of rotation of the shaft, and the speed at which the bearing ring moves on its orbital path is likewise reduced. The eccentric bearing according to the invention has a speed reduction, with a speed of revolution of the eccentricity of the bearing ring being less than a speed of rotation of the shaft when the bearing ring is fixed against relative rotation. The speed reduction has the advantage that a higher speed of rotation of the drive is possible, allowing the use of a smaller and lighter electric motor for the same power.

In order to ensure that the rolling elements roll on the shaft and in the bearing ring and revolve around the shaft when the shaft is driven in rotation, the rolling elements rest against the shaft and the bearing ring under a preload. The preload can be low in order to keep down wear. The level of preload should be chosen so as to ensure that the rolling elements roll on the shaft and in the bearing ring and revolve around the shaft. The rolling elements can exhibit slip as they roll but the magnitude of the preload is preferably chosen so that there is no slip or, at most, negligible slip.

Another advantage of the eccentric bearing according to the disclosure is its simple and low-cost construction.

The eccentric bearing according to the disclosure is provided, in particular, for the application explained in an electrohydraulic piston pump unit for generating a brake pressure in a hydraulic brake system of a motor vehicle, where it converts the rotary motion of an electric motor into a reciprocating motion for driving pump pistons. However, the disclosure is not restricted to this application but is also directed to the eccentric bearing as such.

The description below relates to advantageous embodiments and developments of the disclosure indicated below.

In order to bring about the preload with which the rolling elements rest against the shaft and the bearing ring of the eccentric bearing, at least one embodiment provides an undersize of the bearing ring. The bearing ring surrounding the rolling elements is therefore elastically deformed. Since the bearing ring is not accommodated in a cylindrical bearing receptacle in the manner of a mount when the eccentric bearing is used in an electrohydraulic piston pump unit, it can undergo elastic bending deformation into a noncircular ring shape: at the points at which the bearing ring rests against the rolling elements, it has a relatively pronounced curvature and a less pronounced curvature in between. In this way, there is no difficulty in obtaining an elasticity of the bearing ring to produce the desired preload with which it presses against the rolling elements from the outside and presses the rolling elements inward against the shaft. If necessary for reasons of stability or wear, an additional outer ring of greater thickness surrounding the bearing ring can be provided.

When the eccentric bearing is used in an electrohydraulic piston pump unit, the two pump pistons press against the bearing ring with an equal force in opposite directions in the middle of their stroke. The preload according to the disclosure ensures that the rolling elements are nevertheless pressed against the shaft and the bearing ring and revolve around the rotating shaft.

At least one embodiment includes an elastic ring, e.g. an O-ring, in order to bring about the preload. The elastic ring can rest in an encircling groove in the shaft, in an encircling groove in one or more or all of the rolling elements and/or in an encircling groove on the inside of the bearing ring. The groove is not essential to the disclosure and it is also possible, for example, for an elastic ring which surrounds a rolling element without a groove to run in a groove in the bearing ring and/or in the shaft, or an elastic ring which surrounds all the rolling elements jointly and is guided laterally in a groove in the rolling elements and/or in the bearing ring is provided. The elastic ring projects above a rolling contact surface of the shaft, of the rolling element or elements and/or of the bearing ring and, as a result, presses elastically against the rolling elements, the shaft and/or the bearing ring, thereby achieving the desired preload and ensuring rolling contact and revolution of the rolling elements when the shaft is driven in rotation. The rolling contact surface is the circumferential surface of the shaft of the rolling elements and the inner circumferential surface of the bearing ring.

At least one embodiment includes a rolling element cage which keeps the rolling elements at their relative spacing. The rolling elements can be arranged at equal spacings or at different spacings. The rolling element cage ensures that all the rolling elements revolve jointly. It is especially advantageous if only one or at least not all of the rolling elements has/have an elastic ring because the revolution thereof brought about in this way is transmitted from the rolling element cage to the other rolling elements.

BRIEF DESCRIPTION OF THE DRAWINGS

The disclosure is explained in greater detail below with reference to an illustrative embodiment shown in the drawing, in which.

DETAILED DESCRIPTION

Figure 1:
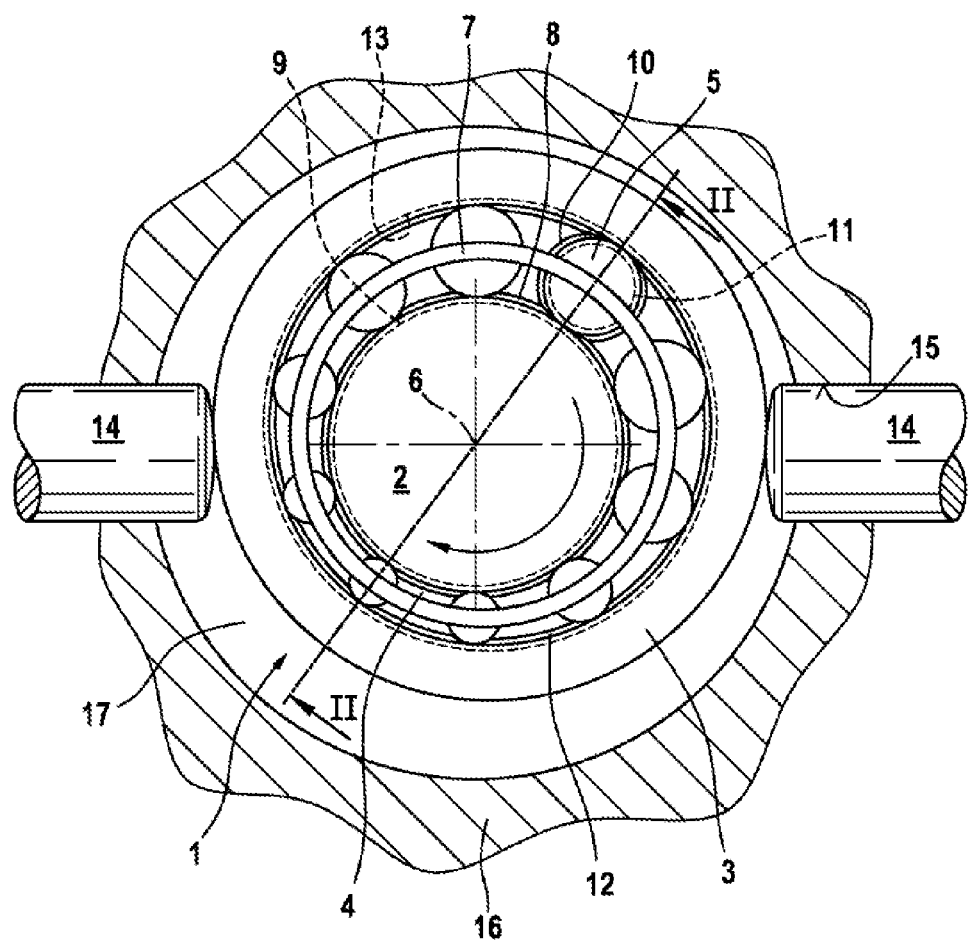
FIG. 1 shows an eccentric bearing according to the disclosure in end view.

The eccentric bearing 1 according to the disclosure, which is shown in the drawing, has a shaft 2, which is surrounded by a bearing ring 3. Rollers are arranged as rolling elements 5 around the shaft 2, in a gap 4 between the bearing ring 3 and the shaft 2. The bearing ring 3 and the rolling elements 5, possibly together with the shaft 2, can be understood as a rolling contact bearing. The shaft 2 can be driven in rotation about the axis 6 thereof, which is simultaneously the axis of rotation thereof, by an electric motor, which is not visible in the drawing because it is behind the plane of the drawing. The shaft 2 does not have any eccentricity. It can be the end of a motor shaft of the electric motor, for example.

The bearing ring 3 is eccentric with respect to the shaft 2, and a width of the gap 4 between the bearing ring 3 and the shaft 2 varies in the circumferential direction. Starting from a maximum gap width, which is at the top right in the drawing, the gap width decreases in both circumferential directions to a minimum gap width, which is opposite the maximum gap width, i.e. at the bottom left in the drawing.

The rollers which form the rolling elements 5 have different diameters according to the different gap width. The diameters of the rolling elements 5 are each as large as the width of the gap 4 between the bearing ring 3 and the shaft 2 at the point where the respective rolling element 5 is located.

When the shaft 2 is driven in rotation, the rolling elements 5 roll on a circumference of the shaft 2 and, in the process, revolve around the shaft 2 at a lower speed of revolution than would correspond to the speed of rotation of said shaft. The maximum gap width of the gap 4 between the bearing ring 3 and the shaft 2 revolves together with the rolling element 5 with the largest diameter. The minimum gap width of the gap 4 between the bearing ring 3 and the shaft 2 likewise revolves around the shaft 2 with the rolling element 5 with the smallest diameter. In other words, each gap width and an eccentricity of the bearing ring 3 in relation to the shaft 2 revolves around the shaft 2 when the shaft 2 is driven in rotation, with the speed of revolution of the eccentricity being less than the speed of rotation of the shaft 2 when the bearing ring 3 does not corotate. The bearing ring 3 moves on an orbital path around the axis 6 of the shaft 2, which is simultaneously the axis of rotation of the latter, wherein a speed of the gyration of the bearing ring 3 is less than the speed of rotation of the shaft 2 and there is therefore a speed reduction.

The eccentric bearing 1 has a rolling element cage 7, which may also be referred to as a roller cage, bearing cage or simply as a cage. The rolling element cage 7 is tubular and has rectangular holes, which may be referred to as pockets and in which the rolling elements 5 are accommodated rotatably. The rolling element cage 7 holds the rolling elements 5 at their spacing relative to one another. The spacings between the rolling elements 5 can be of equal or unequal size.

The bearing ring 3 has an undersize, i.e. it rests under a preload against the rolling elements 5 on the outside and presses them inward with a preload against the shaft 2. The preload ensures that the rolling elements 5 roll on the shaft 2 and in the bearing ring 3 when the shaft 2 is driven in rotation and that they revolve around the shaft 2. Since the bearing ring 3 is not framed in a bearing receptacle, it can bend elastically out of a circular shape into a non-circular ring shape. Owing to its undersize, it is bent elastically in such a way that it has a more pronounced curvature at the locations at which it rests externally against the rolling elements 5 and a less pronounced curvature between the rolling elements 5.

Figure 2:
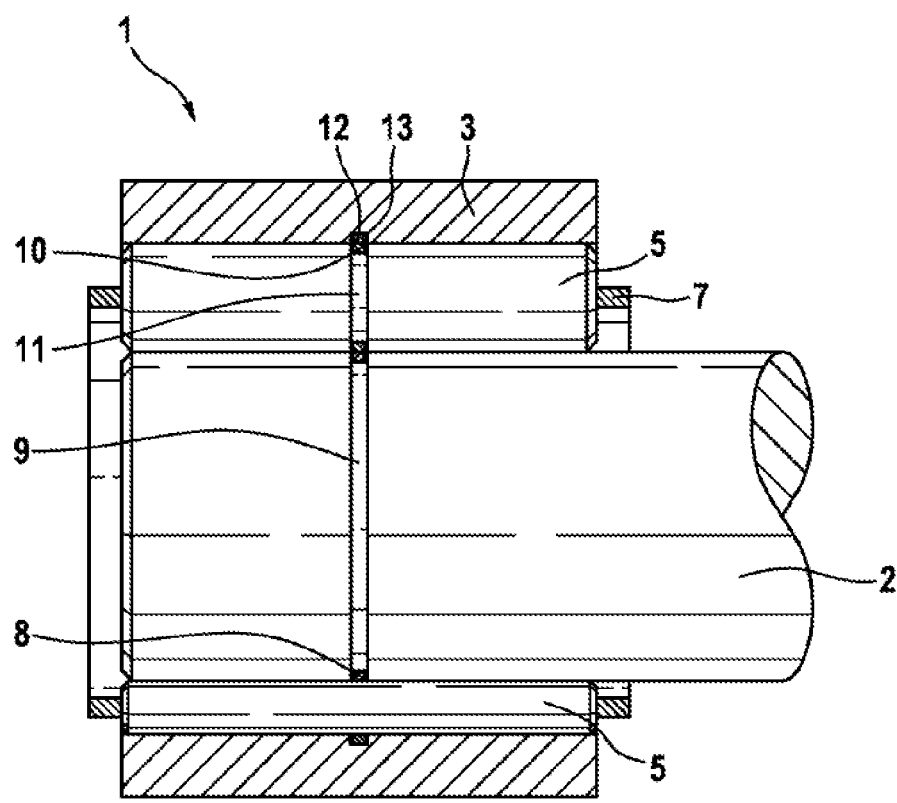
FIG. 2 shows an axial section of the eccentric bearing along the line II-II in FIG. 1.

Another possibility for bringing about the preload is/are one or more elastic rings 8, 10, 12, e.g. O-rings. As can be seen especially in FIG. 2, an O-ring as an elastic ring 8 rests in an encircling groove 9 in the shaft 2. The groove 9 is shallower than the thickness of the elastic ring 8, with the result that the elastic ring 8 projects from the groove 9. The elastic ring 8 presses against the rolling elements 5 and thereby brings about the preload with which the rolling elements 5 rest against the shaft 2 or against the elastic ring 8 resting in the groove 9 of the latter and on the inside against the bearing ring 3.

Another possibility for bringing about the preload is an elastic ring 10 which rests in an encircling groove 11 on at least one of the rolling elements 5. The mode of action of elastic ring 10 in groove 11 of rolling element 5 is the same as the action of elastic ring 8 in groove 9 of shaft 2. The rolling element cage 7 transmits the revolving motion from the rolling element 5 which has the elastic ring 10 to the other rolling elements 5, and therefore an elastic ring 10 on one of the rolling elements 5 is sufficient to ensure that all the rolling elements 5 revolve around the shaft 2.

Another possibility is an elastic ring 12 in an encircling groove 13 on the inside of the bearing ring 3. For the sake of illustration, all three elastic rings 8, 10, 12 are shown in the drawing although one of these elastic rings 8, 10, 12 or the undersize explained above of the bearing ring 3 is sufficient to ensure that the rolling elements 5 make rolling contact and revolve when the shaft 2 is driven in rotation.

Pump pistons 14 rest by means of the ends thereof on the outside of the bearing ring 3. The pump pistons 14, of which only the ends are shown in the drawing, are arranged radially with respect to the shaft 2 and are pressed against the bearing ring 3 from the outside by piston springs (not shown). The pump pistons 14 are accommodated in pump bores 15 of a pump housing 16 in such a way that they can be moved axially, i.e. radially with respect to the shaft 2. The eccentric bearing 1 is located in a cylindrical eccentric space 17 of the pump housing 16, between the two pump pistons 14, which are arranged opposite one another, i.e. in a horizontally opposed arrangement, in the illustrative embodiment. Driving the shaft 2 in rotation causes the bearing ring 3 to move on an orbital path around the axis 6 and the axis of rotation of the shaft 2 at a lower speed than the speed of rotation of the shaft 2, without rotating with the shaft 2. The gyration of the bearing ring 3 drives the pump pistons 14 to perform a reciprocating motion. The eccentric bearing 1 thus converts a rotary motion of the shaft 2 into a reciprocating motion for the purpose of driving the pump pistons 14. The pump housing 16 is part of a so-called hydraulic block, in which not only the pump pistons 14 but also other hydraulic components that are not shown, such as solenoid valves of a slip control device for a hydraulic brake system of a motor vehicle are arranged and hydraulically interconnected. Such hydraulic blocks are known per se and will not be explained further here.

The invention claimed is:

1. An eccentric bearing for converting a rotary motion into a reciprocating motion comprising:
a shaft configured to be driven rotationally;
a bearing ring, which eccentrically surrounds the shaft;
a plurality of rolling elements arranged around the shaft in a gap between the shaft and the bearing ring, wherein:
at least one rolling element of the plurality of rolling elements includes at least one rolling element elastic ring arranged on the at least one rolling element and configured to bring the rolling elements into contact with the shaft and the bearing ring;
the rolling elements have different diameters according to a varying width of the gap;
the shaft includes an elastic ring wrapped around the shaft and configured to bring the rolling elements into contact with the shaft and the bearing ring; and
the bearing ring reciprocates eccentrically about the shaft with the varying width of the gap.

2. The eccentric bearing as claimed in claim 1, wherein the elastic ring is wrapped around the shaft in direct contact with the shaft.

3. The eccentric bearing as claimed in claim 1, wherein the shaft includes a groove configured to retain the elastic ring.

4. The eccentric bearing as claimed in claim 1, further comprising a rolling element cage.

5. The eccentric bearing as claimed in claim 1, wherein:
the bearing ring includes a bearing ring elastic ring arranged inside the bearing ring and configured to bring the rolling elements into contact with the shaft and the bearing ring.

6. An eccentric bearing for converting a rotary motion into a reciprocating motion comprising:
a shaft configured to be driven rotationally;
a bearing ring, which eccentrically surrounds the shaft, the bearing ring arranged in direct contact with at least one piston, the bearing ring having an inner diameter;
a plurality of rolling elements arranged around the shaft in a gap between the shaft and the bearing ring, at least one of the rolling elements including an elastic ring wrapped around the at least one rolling element, and the plurality of rolling elements having an outer diameter, each rolling element of the plurality of rolling elements arranged in direct contact with the bearing ring, wherein:
the bearing ring includes a bearing elastic ring arranged inside the bearing ring and configured to bring the rolling elements into contact with the shaft and the bearing ring;
the rolling elements have different diameters according to a varying width of the gap;
the inner diameter of the bearing ring is smaller than the outer diameter of the plurality of rolling elements so as to bring the rolling elements into contact with the shaft and the bearing ring; and
the bearing ring reciprocates eccentrically about the shaft with the varying width of the gap.

7. The eccentric bearing as claimed in claim 6, wherein the elastic ring is wrapped around the at least one rolling element in direct contact with the at least one rolling element.

8. The eccentric bearing as claimed in claim 6, wherein the at least one rolling element includes a groove configured to retain the elastic ring.

9. The eccentric bearing as claimed in claim 6, further comprising a rolling element cage.

10. The eccentric bearing as claimed in claim 6, wherein:
the shaft includes a shaft elastic ring wrapped around the shaft and configured to bring the rolling elements into contact with the shaft and the bearing ring.

11. An eccentric bearing for converting a rotary motion into a reciprocating motion comprising:
a shaft configured to be driven rotationally;
a bearing ring, which eccentrically surrounds the shaft; and
a plurality of rolling elements arranged around the shaft in a gap between the shaft and the bearing ring, wherein:
the rolling elements have different diameters according to a varying width of the gap;
the shaft includes a shaft elastic ring configured to bring the rolling elements into contact with the shaft and the bearing ring;

the bearing ring includes a bearing ring elastic ring configured to bring the rolling elements into contact with the shaft and the bearing ring; and at least one of the plurality of rolling elements includes a rolling element elastic ring configured to bring the rolling elements into contact with the shaft and the bearing ring.

* * * * *